United States Patent [19]
Kobayashi

[11] Patent Number: 5,699,250
[45] Date of Patent: Dec. 16, 1997

[54] VEHICLE COMMUNICATION SYSTEM

[75] Inventor: Masayuki Kobayashi, Anjo, Japan

[73] Assignee: Nippondenso Co., Ltd., Kariya, Japan

[21] Appl. No.: 493,705

[22] Filed: Jun. 22, 1995

[30] Foreign Application Priority Data

Jun. 23, 1994 [JP] Japan .................. 6-142017

[51] Int. Cl.$^6$ .................................. B60R 16/02
[52] U.S. Cl. ..................... 364/424.058; 364/423.098
[58] Field of Search .................. 364/423.098, 424.058,
364/431.01, 431.04, 431.12; 395/728, 732,
287, 291, 294, 301, 303

[56] References Cited

U.S. PATENT DOCUMENTS

| | | | |
|---|---|---|---|
| 4,855,896 | 8/1989 | Oho et al. | 364/138 |
| 4,964,076 | 10/1990 | Schurk | 340/825.5 |
| 5,001,642 | 3/1991 | Botzenhardt et al. | 364/431.12 |
| 5,303,348 | 4/1994 | Botzenhardt et al. | 364/431.04 |
| 5,311,510 | 5/1994 | Moriue et al. | 370/61 |
| 5,369,581 | 11/1994 | Ohsuga et al. | 364/431.04 |
| 5,444,626 | 8/1995 | Schenk | 364/431.04 |
| 5,467,272 | 11/1995 | Yoshida et al. | 364/431.04 |
| 5,490,064 | 2/1996 | Minowa et al. | 364/431.01 |

FOREIGN PATENT DOCUMENTS

| | | |
|---|---|---|
| 61-195453 | 8/1986 | Japan . |
| 3128542 | 5/1991 | Japan . |

Primary Examiner—Gary Chin
Attorney, Agent, or Firm—Cushman, Darby & Cushman IP Group of Pillsbury, Madison & Sutro, LLP

[57] ABSTRACT

An engine ECU, an AT ECU, a meter ECU and an ABS ECU are connected by a common communication line. The CPU of the engine ECU computes various transmission data according to the detection results of sensors and switches and stores it in a memory. The CPU reorders the transmission data in the memory in ID order according to a preset ID (identification data). The reordered transmission data is then sent to the communication control circuit via a data transmission line. The transmission data is sent to the communication line according to transmission order. By sending the transmission data in the ID order, it is possible to minimize the transmission waiting time of high priority data. Moreover, if there is collision of different data on the communication line, the higher priority data is given priority in sending.

9 Claims, 7 Drawing Sheets

FIG. 6B

| ID=01 (BRAKE) | ID=05 (THROTTLE) | ...... | ID=23 (SPEED) | ID=25 (ACCELERATOR) | ID=35 (TORQUE) | ... |

FIG. 6A

| ENGINE SPEED | BRAKE PEDAL POSITION | ...... | TORQUE | ACC. PEDAL POSITION | THROTTLE OPENING | ... |

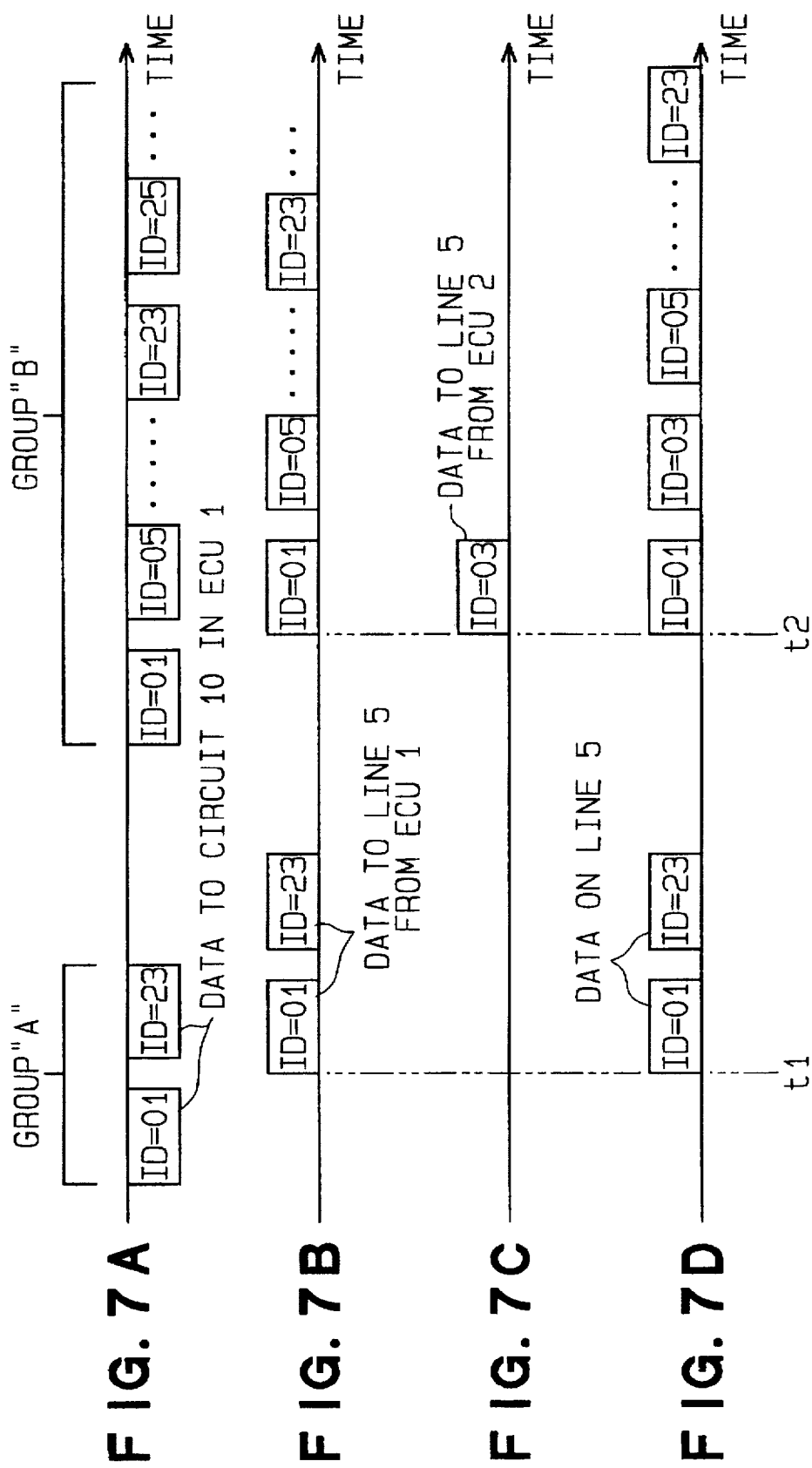

VEHICLE COMMUNICATION SYSTEM

CROSS REFERENCE TO RELATED APPLICATION

This application is based on and claims priority from Japanese Patent Application No. 6-142017, the content of which is incorporated herein by reference.

BACKGROUND OF THE INVENTION

1. Field of the Invention

The present invention concerns a vehicle-mounted communication system, more specifically, a vehicle-mounted communication system by which multiple vehicle-mounted computers to carry out various computations required for electronic control of the vehicle are connected to a common communication line via individual communication devices.

2. Description of Related Art

The conventional type of vehicle-mounted communication system requires multiple vehicle-mounted computers (CPU) to carry out the various computations required for electronic control of the vehicle. The computers are connected by a common communication line via the individual communication devices. Moreover, data sent from the vehicle-mounted computers to the communication devices is assigned identification data (ID) to indicate the order of priority so that data with the corresponding ID is sent from the communication devices to the communication line. In such a case, the data is normally sent from the communication devices to the communication line according to the order of transmission from the vehicle-mounted computers to the communication devices. Moreover, if differing data should collide on the communication line, data with the higher order of priority is given priority for sending. (For example, Japanese patent application laid-open No. 61-195453). Such a communication method is commonly known as a non-destructive CSMA/CD.

Moreover, according to Japanese patent application laid-open No. 3-128542, a vehicle-mounted communication system is disclosed in which the order of priority of data is changed according to the running conditions of the vehicle, and whereby the data required according to the running conditions at that time is given priority in sending.

However, with the conventional communication systems described above, when the vehicle-mounted computers send multiple data together to the communication devices, the data is sent regardless of the order of priority as indicated by identification data. As a result, when the data sent is sent to the communication line according to the order of sending, waiting for transmission of high priority data results in a delay in transmission of such data. In other words, the computation of the various data by the vehicle-mounted computers is not always in agreement with the order of priority as indicated by the identification data, but rather is based on the design philosophy of the vehicle-mounted control system. Thus, even if the order of priority is low, there is data that is computed first and, as mentioned above, even when data has a high order of priority, there is a problem such that delays occur in the transmission of data.

Particularly in cases where the data sent first collides with data from another computer, due to arrangement of data because of data collision, there is the problem that the waiting time of high priority data Sent later becomes even longer. If the waiting time of high-priority data becomes longer, there is the likelihood that this could cause impediments to vehicle control in the vehicle-mounted computer that receives transmission.

In other words, with conventional communication systems, because there is no discipline to the sending order of groups of data sent from the vehicle-mounted computers to the communication devices, there were cases where high-priority data was sent after low-priority data. As a result, even if the order of priority of data sent from the communication devices to the communication lines was high, there were transmission waits and the problem of delays in transmission of data.

SUMMARY OF THE INVENTION

The present invention has been made in consideration of the above-mentioned problems. Its purpose is to provide a vehicle-mounted communication system in which the transmission waiting time for high-priority data is minimized.

According to the present invention, vehicle-mounted computers are assigned with respective identification data to indicate the order of priority of computation data required for electronic control of a vehicle, so that the applicable data is sent from a communication device to a communication line. The vehicle-mounted computer sends data to the communication device in the order of highest priority as indicated by the identification data, regarding data groups to be sent together. Furthermore, the data sent is sent to the communication line from the communication device in the sending order. Thus, the sending order of groups of data sent from the vehicle-mounted computers to the communication devices is determined according to the order of priority, thus minimizing transmission waiting times for high-priority data.

Furthermore, if data sent from the vehicle-mounted computers collides on the communication lines, high-priority data is sent first according to the identification data. Thus, even if there is a collision of different data, the transmission waiting time of high-priority data is minimized.

Preferably, the vehicle-mounted computers first record the computed data in a memory. Then the computation data stored in the memory is rearranged or reordered in order of priority in response to preset identification data. Afterwards the rearranged computation data is sent to the communication devices.

More preferably, the vehicle-mounted computers carry out blocking at each processing cycle in which the data is computed in the computation program regarding the sending of data groups to be sent together, send data to the communication device starting in order with data in the block with a short processing cycle and in order of highest priority as indicated by the identification data. In such a case, the transmission waiting time of high-priority data is minimized and there is prevention of the transmission omissions likely to occur in computation programs with a short processing cycle. Thus, transmission omissions are prevented and the computation data is accurately transmitted.

BRIEF DESCRIPTION OF THE DRAWINGS

In the accompanying drawings:

FIGS. 6A and 6B show, respectively, storage data prior to reordering and storage data after reordering in storage areas of a memory in the CPU;

FIGS. 7A through 7D are time charts showing mode of operation in the first embodiment.

DETAILED DESCRIPTION OF THE PREFERRED EMBODIMENTS

(First Embodiment)

Next follows a description of embodiments of the vehicle communication system of the present invention with reference to the accompanying drawings.

Figure 1:
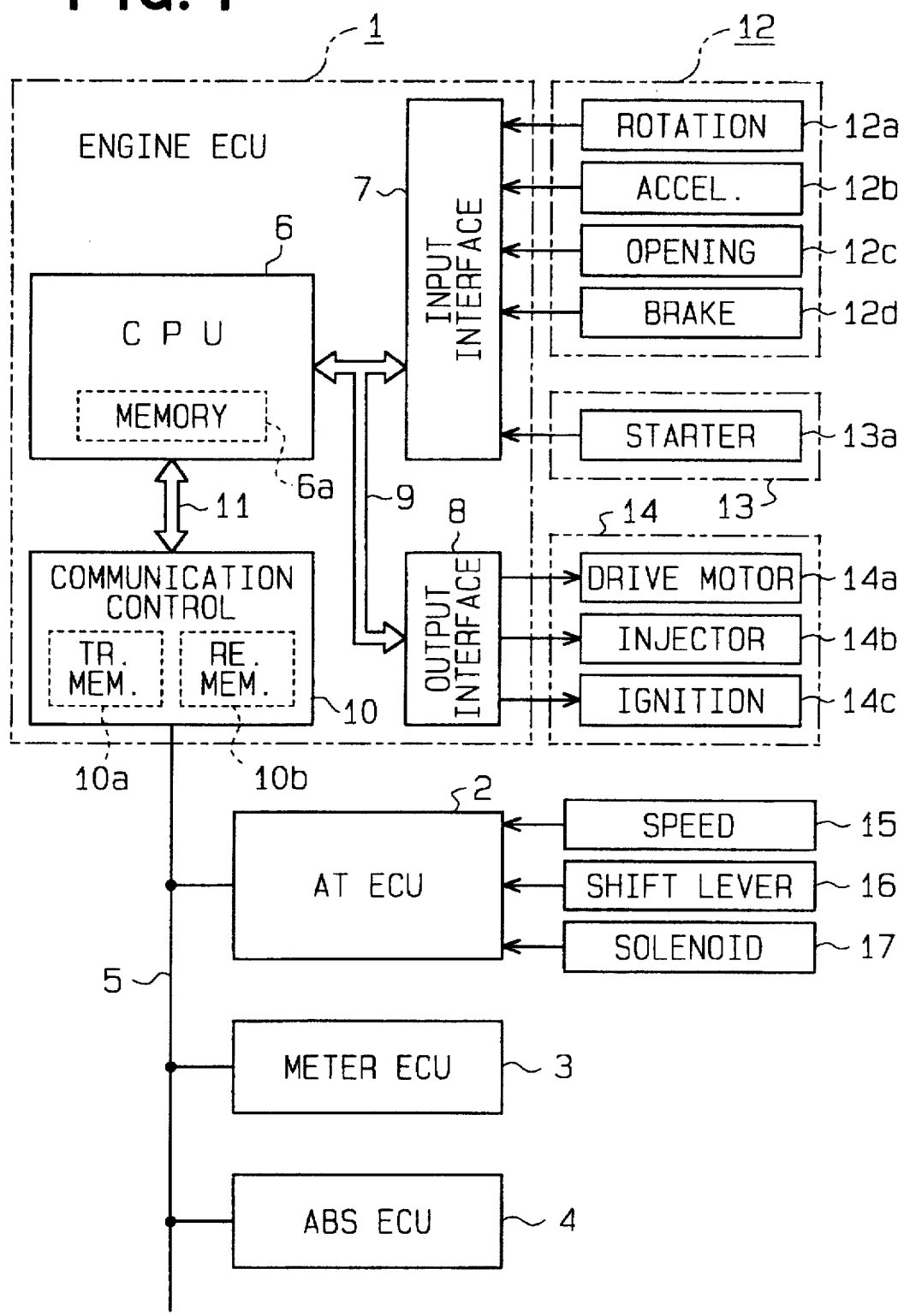
FIG. 1 is a block diagram showing a first embodiment of a vehicle communication system according to the present invention.

FIG. 1 shows a general outline of the vehicle-mounted communication system in the first embodiment. As shown in the figure, a vehicle (automobile) is mounted with various electronic control devices to carry out electronic control of the vehicle. More specifically, there is mounted, for example, an engine-control electronic control unit (engine ECU) 1, an automatic transmission electronic control unit (AT ECU) 2, a meter electronic control unit (meter ECU) 3 and an antilock brake system electronic control unit (ABS ECU) 4. The ECUs 1–4 are connected by a common communication line 5, thus enabling mutual communication via the communication line 5. In the present embodiment, use is made in the ECUs 1–4 of a communication method known as a non-destructive CSMA/CD.

Regarding the structure of ECUs 1–4, an example is given to describe the engine ECU 1 in detail. In the engine ECU 1, a CPU 6 consisting of a one-chip microcomputer, an input interface 7 and an output interface 8 are connected via a bus 9. The CPU 6 acts as the vehicle-mounted computer. It includes a memory 6a to store control programs or carry out temporary storage of computation data of CPU 6.

Connected to the input interface 7 are a group of sensors 12 to detect the running state of the vehicle and a group of switches 13. Connected to the output interface 8 are a group of actuators 14 required for running the vehicle. In the present case, for example, the sensors 12 include an engine rotation angle sensor 12a to detect a rotational angle position of the engine, an accelerator position sensor 12b to detect a depression position of the accelerator pedal, a throttle opening sensor 12c to detect a throttle valve opening angle, and a brake position sensor 12d to detect a depression position of a brake pedal. The switches 13 include a starter switch 13a to detect engine start (cranking) with a stator motor, etc. The actuators 14 are composed of a throttle drive motor 14a to control opening position of a throttle valve, an injector 14b to carry out injection supply of fuel to the engine, and an ignition device 14c to induce high voltage to an ignition coil and generate an ignition spark in the spark plug.

The CPU 6 computes various data indicating the running condition of the vehicle based on detection signals from the sensors 12 and the switches 13 (engine rotational speed and accelerator pedal position, etc.). It also computes the control data to carry out drive control of the actuators 14 (control amount of the throttle drive motor 14a and fuel injection amount).

The communication control circuit 10 acting as a communication device includes a transmission (TR) memory 10a for storing transmission data sent from the CPU 6 and a reception (RE) memory 10b for storing reception data received from the other ECUs. The communication control circuit 10 and the CPU 6 are connected via a data transmission line 11. Via data transmission line 11 there is transmission of sending data from the CPU 6 to the above-mentioned transmission memory 10a, as well as receipt of reception data from the above-mentioned reception memory 10b to the CPU 6.

As for the other ECUs 2–4, they possess basically the same structure as the above-mentioned engine ECU 1. Each contains a CPU, communication line, etc. for controlling the various actuators according to detection signals from the sensors and switches, and for carrying out exchange of transmission/reception data. For example, the following are connected to the AT ECU 2: a speed detection sensor 15 for detecting vehicle speed according to a rotation of the output axle of the transmission, a shift lever switch 16 for detecting a position of a shift lever, and a speed-changing solenoid valve 17 to change gears of the transmission to attain the shift position set according to the vehicle speed and throttle opening. (Details are omitted here regarding ECUs 3 and 4).

Regarding data communication among the ECUs 1–4, for example, engine rotational speed data computed by the engine ECU 1 passes through the communication line 5 for transmission to the meter ECU 3. Then the engine rotational speed data is used to drive the tachometer in the meter ECU 3. Furthermore, the rotational speed data from the AT ECU 2 passes through the communication line 5 for transmission to the engine ECU 1 where it is used for throttle control in the engine ECU 1. Likewise, the data among the above-mentioned ECUs 1–4 include pre-setting of respective ID (identification data) to indicate the order of priority of communication. Thus, if there is a collision of data on the communication line 5, data with a higher order of priority according to ID is given priority in data transmission.

Next follows a description of the mode of operation of a vehicle communication system constructed as described above. With the present system, in order to improve real time characteristics and safety, there is communication at set intervals in which the communication requests for the system are generated at set cycles.

Figure 2:
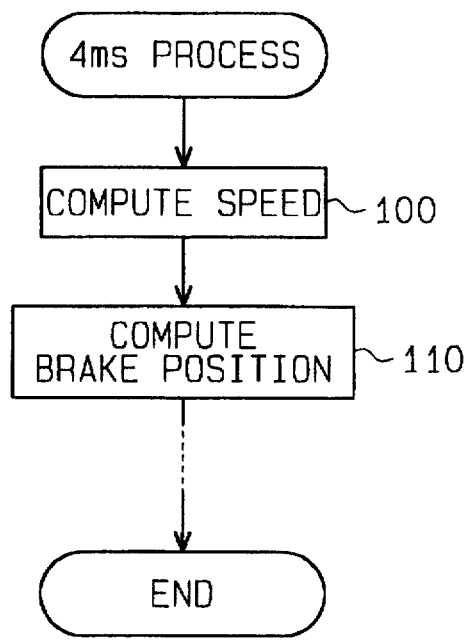
FIG. 2 is a flowchart showing a 4 ms processing routine executed by a CPU of an engine ECU.
Figure 3:
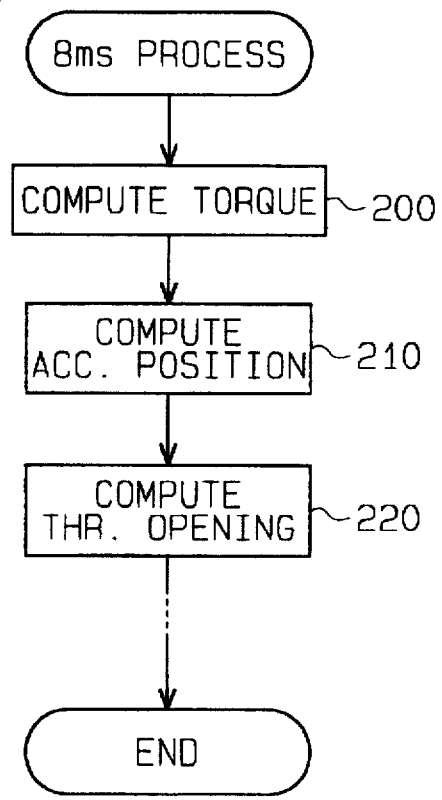
FIG. 3 is a flowchart showing a 8 ms processing routine executed by a CPU of an engine ECU.
Figure 4:
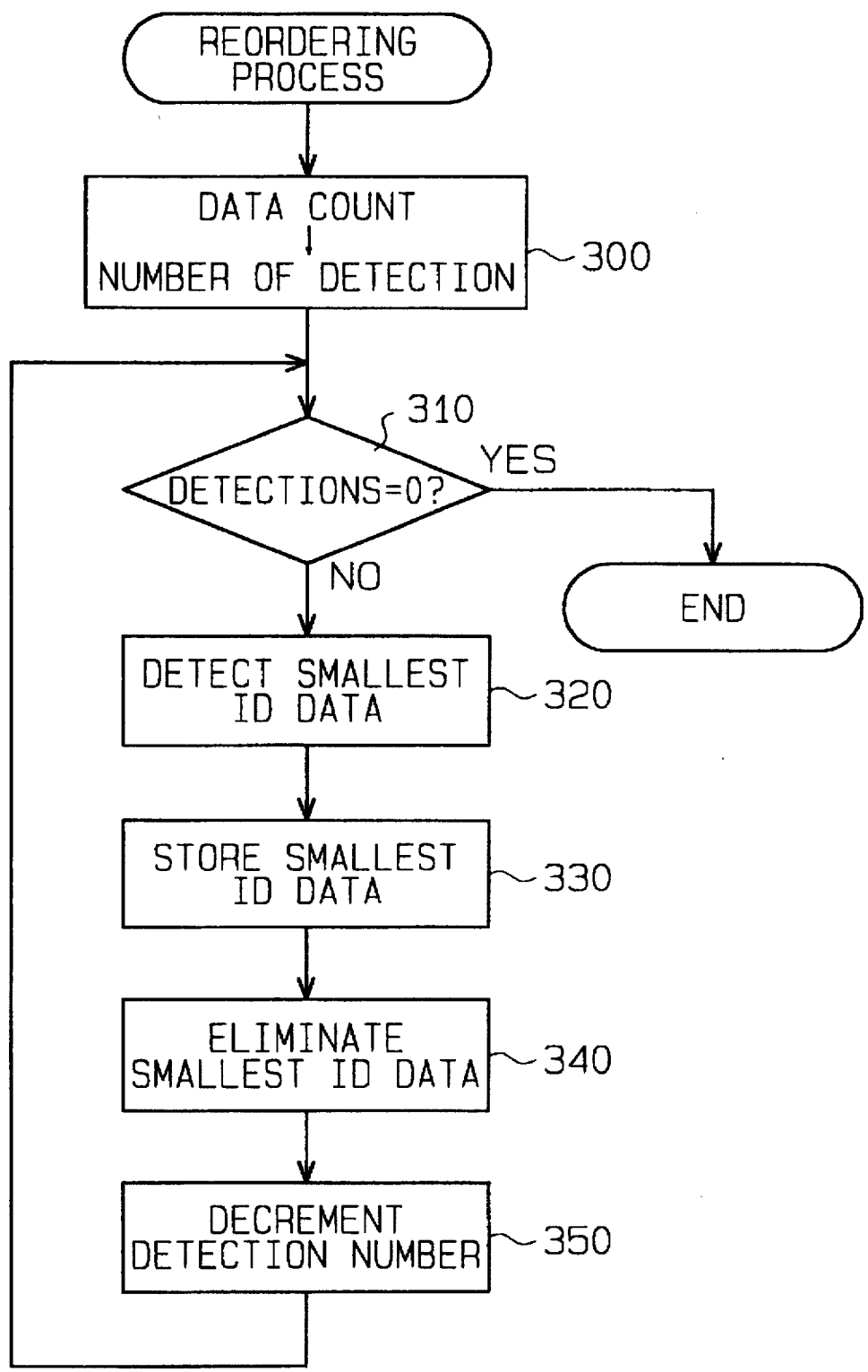
FIG. 4 is a flowchart showing a reordering routine of transmission data in ID order in the first embodiment.
Figure 5:
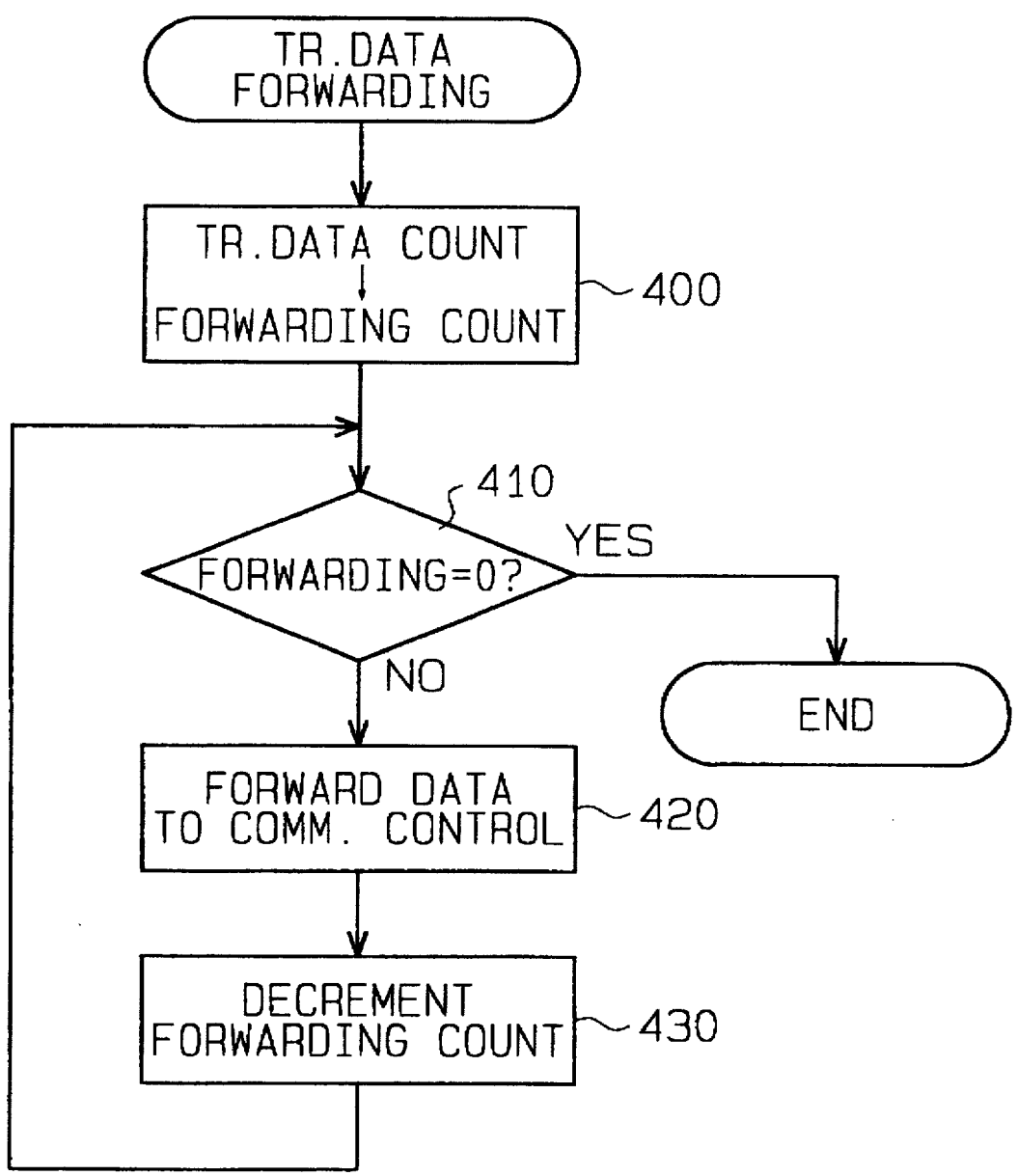
FIG. 5 is a flowchart showing a routine for sending of transmission data from the CPU to a communication control circuit in the first embodiment.

FIGS. 2–5 are flowcharts showing control programs executed by the CPU 6 in the engine ECU 1. More specifically, FIG. 2 and FIG. 3 are processing routines for generating the transmission data in communication at regular intervals. They are set so that the transmission requests for transmission data are generated during the processing time. In FIG. 2 there is execution every 4 ms, in FIG. 3 there is execution every 8 ms. These are so set that, the larger the per-time change amount of the data, the shorter the processing cycle. FIG. 4 is a processing routine for rearranging or reordering the various data computed in FIG. 2 and FIG. 3 starting with the smallest ID. FIG. 5 is the processing routine by which transmission data which has undergone reorganization according to ID is sent to the communication control circuit 10 via the data transmission line 11.

In the 4 ms routine shown in FIG. 2, the CPU 6 computes the various data every 4 ms according to the detection results from the sensors 12. The data is stored in the designated area in the memory 6a of the CPU 6. FIG. 2 shows one section of processing. In step 100, the CPU 6 computes the engine rotational speed (RPM) based on the detection results of the engine rotational speed sensor 12a. In step 110 it computes the brake pedal position according to the detection results of the brake position sensor 12d.

In the 8 ms processing routine shown in FIG. 3, the CPU 6 computes the various data according to the detection results from the sensors 12. The data is stored in the designated area in the memory 6a. FIG. 3 shows one part of processing. In step 200, the CPU 6 computes the engine torque according to the engine rotational speed and intake air volume, for instance. In step 210 it detects the accelerator pedal position according to the detection results of the accelerator position sensor 12b. In step 220 it detects the throttle opening angle according to the detection results of the throttle opening sensor 12c.

Meanwhile, regarding the communication data reorganization or reordering routine in FIG. 4, in step 300 the CPU 6 sets the data items count (number of data) of the transmission data group at that time as the number of detections or retrievals in the present routine. For example, when reorganizing the transmission data according to 4 ms processing or 8 ms processing, the total of the transmission data items computed in both processes is set as the numbers of detection.

In the following step 310, the CPU 6 determines whether the number of detections is [0] or not. If the number of detections is not equal to 0, the CPU proceeds to step 320 to detect the transmission data corresponding to the smallest ID among the transmission data group. In other words, the necessary ID is assigned beforehand to each transmission data. The CPU 6 carries out data detection while matching the transmission data and the ID. In the present case, the higher the level of priority, the smaller the value of the ID which is set.

Then in step 330, the CPU 6 stores the data with the smallest ID in the designated area in the memory 6a. In the subsequent step 340 the transmission data of the smallest ID as detected and stored above is eliminated from the transmission data group. Then, in step 350 the CPU 6 decrements the detection frequency or number by [1] after which it returns to step 310. Subsequently, the CPU 6 repeats steps 320 to 350 until the detection number becomes [0] ( i.e., until determination of step 310 becomes positive).

In the present case, FIGS. 6A and 6B show an example of separately set storage areas in the memory 6a of the CPU 6 and of recorded or stored data. The transmission data that was computed according to the routines in FIG. 2 and FIG. 3 above is stored as shown in FIG. 6A. The transmission data that was reorganized according to the routine in FIG. 4 above is stored as shown in FIG. 6B. In other words, in FIG. 6A the various transmission data is stored for each computation cycle. Meanwhile, in FIG. 6A there is reorganization of the transmission data according to the ID order followed by storage. In FIG. 6B, ID=01 corresponds to the brake pedal position data, ID=05 corresponds to the throttle opening data, ID=23 corresponds to the engine rotational speed data, ID=25 corresponds to the accelerator pedal position data, and ID=35 corresponds to the torque data.

The transmission data transmission or forwarding routine in FIG. 5 is executed every 4 ms. In the routine shown in FIG. 5, first of all, in step 400, the CPU 6 sets the transmission data number or count as the transmission data forwarding number or count for the present routine. Then, in step 410, the CPU 6 determines whether the forwarded data is [0] or not. In the present case, if the sequence is immediately after the forwarding data count was set in the above-mentioned step 400 then the determination of step 410 is negative. The CPU 6 then proceeds to step 420. As was the case in FIG. 6B above, one item of the stored data is sent to the communication control circuit 10 via the data transmission line 11. At this time, the transmission data is sent to the communication control circuit 10 in the ID order (starting in order with the smallest ID). Next, in step 430, the CPU 6 carries out decrement by [1], after which there is return to step 410. Following this, the CPU 6 repeats steps 420 and 430 until the data forwarding count becomes [0], that is, until step 410 determines positively.

Subsequently, the transmission data that is sent as described above from the CPU 6 to the communication control circuit 10 is then sent in the transmission order one by one from the communication control circuit 10 to the communication line 5. If the communication line 5 is empty at present, the transmission data is sent in its present state in the order of transmission. If the communication line 5 is being used, the data undergoes the prescribed reorganization according to priority after which there is sending of the transmission data.

Although detailed mention is omitted here, there are similar control programs for ECUs 2–4 corresponding to FIG. 2 to FIG. 5. In ECU 2 to ECU 4, there are processes like those described above whereby there is storage in the memory of transmission data reorganized according to ID priority. The reorganized transmission data is sent to the communication control circuits (communication devices) in the individual ECUs.

Next follows a description of the actual communication state of the transmission data by means of the timing chart in FIGS. 7A through 7D. FIG. 7A shows the transmission data sent from the engine ECU 1 and the AT ECU 2 to circuit 10 in respective ECUs and FIG. 7B shows the communication data transmitted to the communication line 5. In those figures, the data is expressed as ID. The time t1 expresses the timing for transmission of data from the engine ECU 1. The time t2 shows the timing when the transmission data from the engine ECU 1 and data from the AT ECU 2 are set simultaneously.

The following is a more detailed description of FIGS. 7A through 7D. In the engine ECU 1, regarding the transmission data sent from the CPU 6 to the communication control circuit 10, the data that is sent together in a group is organized according to the order of the smallest ID as a single group (in FIG. 7 expressed as Group "A" and Group "B" for the sake of convenience). In the present case, Group "A" corresponds to the data group that is computed in 4 ms processing in FIG. 2. Group "B" corresponds to the data group that is computed in 4 ms processing in FIG. 2 and 8 ms processing in FIG. 3.

At the time t1 at which the data in Group "A" is transmitted, there is no transmission data from the other ECU (in this case, the AT ECU). As a result, the data in Group "A" is sent in its present state to the communication line 5. In other words, the brake pedal position data (ID=01) which has higher priority is sent to the communication line 5 without a transmission wait, after which the engine rotational speed data (ID=23) is transmitted.

At the time t2 during which the data in Group "B" is sent, the speed data (ID=03) from the AT ECU 2 exists, so that the brake pedal position data (ID=01) and the speed data (ID=03) collide with each other in the communication line 5. In such a case, of the two groups of data, the higher priority brake pedal position data (ID=01) is sent first, after which the speed data (ID=03) is sent. Then, the other data in Group "B" (ID=05, 23, 25, etc.) is sent from the engine ECU 1 to the communication line 5 according to the ID order. That is, in such a case as well, standby or wait for transmission of the brake pedal position data (ID=01) is eliminated so that, regarding the transmission data groups from ECU 1 and ECU 2, there is shortening of the waiting time caused in sending high priority data.

As was mentioned above, according to the vehicle communication system in the first embodiment, it is possible to obtain the following advantages.

In other words, in the conventional communication system, regarding the individual data of the transmission data groups sent from the CPU 6 to the communication control circuit 10, because there is no regularity in the order of sending, there were cases where high priority data was sent after low priority data. As a result, in case of sending transmission data from the communication control circuit 10 to the communication line 5, there was a wait for transmission of high priority data, thus producing a delay in sending such data. However, in the communication system according to the present embodiment, the transmission order of transmission data groups sent from the CPU 6 to the communication control circuit 10 is in accordance with the predetermined order of priority. As a result, when carrying out data transmission according to transmission order, it is possible to minimize the transmission waiting time of high priority data.

Furthermore, in the system such as that in the present embodiment where there is sending in order of priority according to ID, if the transmission data sent from the ECUs 1–4 should collide with each other in the communication line 5, the data with higher priority according to ID is given priority in sending. As a result, with the conventional communication system where there is no regularity in the sending order of transmission data groups from the CPU 6 to the communication control circuit 10, due to ordering of the data in case of data collision, the transmission waiting time of high priority data sent afterward became even longer. However, in the communication system in the present embodiment, even if there is a collision of different transmission data, it is possible to minimize the transmission waiting time of high priority data.

(Second Embodiment)

Next follows a description of a second embodiment of the present invention, primarily on the differences from the first embodiment. In the first embodiment described above, there was reordering by ID order of all data that was to be sent at the same time. The data that had undergone reordering was then sent from the CPU 6 to the communication control circuit 10. In contrast, in the second embodiment, regarding a case where there are multiple computation programs with differing processing cycles, there is blocking of the data from the corresponding program for each processing cycle and the transmission data is then transmitted according to the block unit (unit for each processing cycle).

Figure 8:
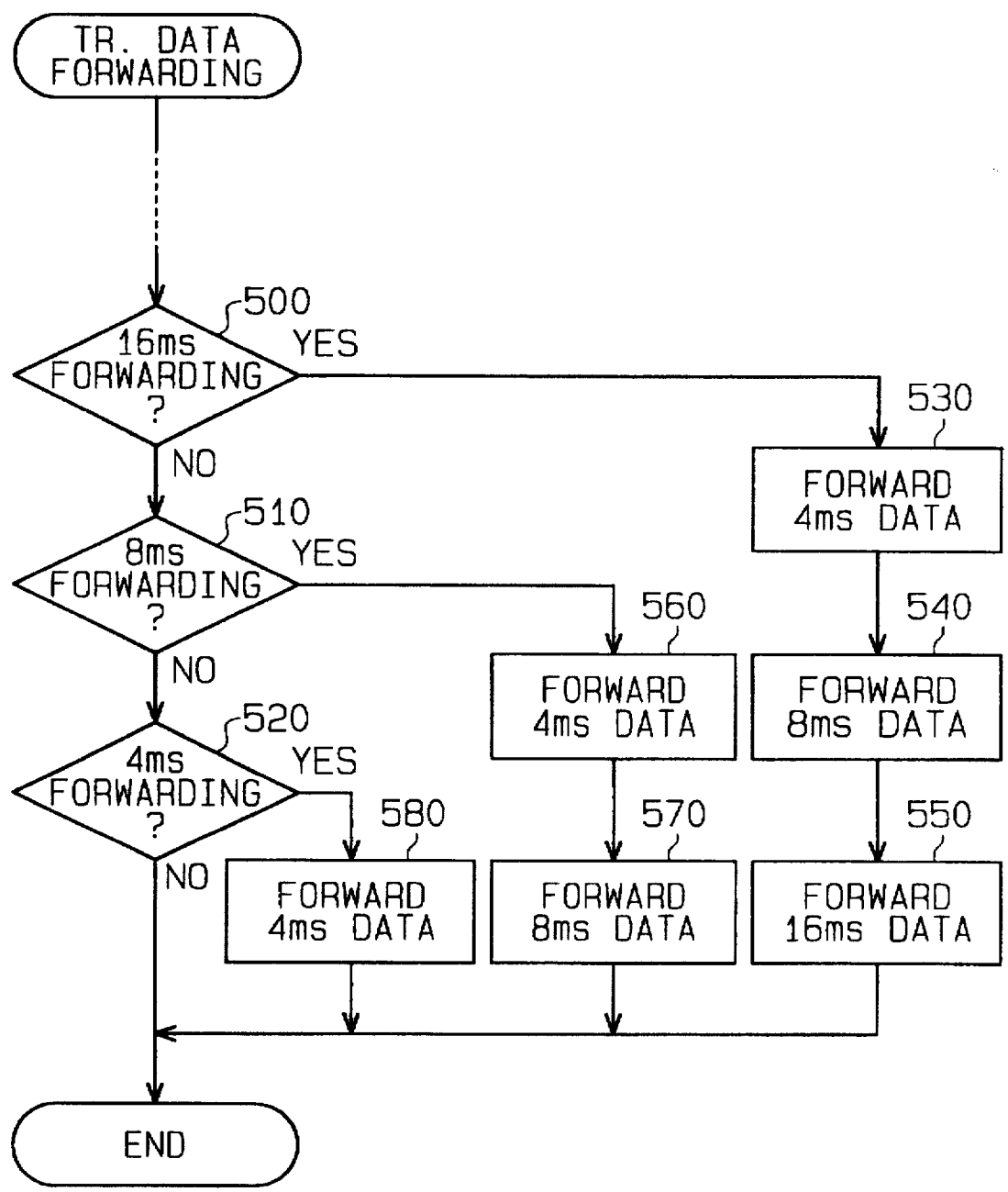
FIG. 8 is a flowchart showing a sending routine of the transmission data in a second embodiment.

FIG. 8 shows the forwarding routine for transmission data in the second embodiment. The routine is executed every 4 ms in the CPU 6. Furthermore, in FIG. 8, in addition to the 4 ms processing in FIG. 2 and the 8 ms processing in FIG. 3, there is handling of transmission data that has been computed by means of 16 ms processing not shown in the figures.

In FIG. 8, the CPU 6 determines what kind of processing data is transmitted in steps 500–520. More specifically, if step 500 determines positively, then in steps 530–550 the CPU 6 transmits the data from 4 ms processing, 8 ms processing and 16 ms processing to the communication control circuit 10 according to the ID order. If step 510 determines positively, then in steps 560 and 570, the CPU 6 transmits the data from 4 ms processing and 8 ms processing to the communication control circuit 10 in the ID order. Furthermore, if step 520 determines positively, then in step 580 the CPU 6 forwards the data from 4 ms processing to the communication control circuit 10 according to ID order. In forwarding multiple blocks of transmission data groups, the data is sent starting with the blocks having the shorter processing cycle.

As this shows, in the second embodiment there is blocking of the transmission data for each processing cycle. Also, regarding data to be transmitted at the same time, there is transmission of the transmission data form the CPU 6 to the communication control circuit 10 in order starting with data in blocks having a short processing cycle and in order of priority according to ID. As a result, it is possible to obtain the following results.

It is possible to minimize the transmission wait of high priority transmission data while preventing data omissions of transmission data with short processing cycles. In other words, if transmission standbys become longer than in conventional communication systems, there is a so-called "transmission omission" in which the data which was sent first is eliminated by the data sent subsequently. However, in the present embodiment, such a transmission omission is prevented and it is possible to accurately carry out transmission of data.

Also, in addition to the first embodiment and the second embodiment, present invention may be modified as follows.

In the first embodiment described above, there is storage of the various transmission data in the memory 6a by means of the routines in FIG. 4 and FIG. 5 and in correspondence with ID order. It is also possible to provide storage areas beforehand in the memory 6a arranged according to ID order so that there is storing of the transmission data in the ID areas in correspondence with the different IDs.

According to the invention, regarding data to be transmitted at the same time, there is sending of high priority transmission data to the communication device according to the order of priority. This has the outstanding effect of minimizing the transmission wait for high priority data.

Further, by sending the data to the communication circuit after reordering of data, it is possible to further limit the transmission waiting time of high priority data.

Still further, the transmission wait of high priority data is minimized and it is also possible to prevent the transmission omissions that are likely to occur in computation programs with short processing cycles.

What is claimed is:

1. A vehicle communication system comprising:
 a plurality of multiple vehicle-mounted computers for carrying out various computations required for electronic controls of a vehicle, each vehicle-mounted computer including a communication device for data transmission therethrough;
 a common communication line connecting the vehicle-mounted computers to each other via respective ones of the communication;
 each of the vehicle-mounted computers assigning identification data to computation data to indicate a priority of the computation data so that the computation data is sent from the respective ones of the communication devices to the common communication line;
 each of the vehicle-mounted computers reordering the prioritized computation data and sending the reordered data to said respective ones of the communication devices in an order of highest priority as indicated by said identification data; and the communication devices sending the reordered computation data to the common communication line in an order received.

2. A vehicle communication systems as in claim 1, wherein each of the vehicle-mounted computers comprises:

means for storing the prioritized computation data in a memory;

means for reordering the prioritized computation data in said memory; and means for forwarding the reordered computation data to a respective one of the communication devices.

3. The vehicle communication system as in claim 2, wherein the each of the vehicle-mounted computers further comprises:

means for stopping a transmission of the computation data through the common communication line from the respective one of the communication devices when another computation data having a higher priority is to be transmitted through the common communication line from another one of the vehicle-mounted computers, and for transmitting the computation data after the transmission of the computation data having the higher priority is completed.

4. The vehicle communication system according to claim 1, wherein the each multiple vehicle-mounted computer stores the reordered computation data in storage areas in a memory, the storage areas being arranged according to the order of highest priority as indicated by the identification data.

5. A vehicle communication system comprising:

a plurality of multiple vehicle-mounted computers for carrying out, at different processing cycles, various computations required for electronic controls of a vehicle, each vehicle-mounted computer including a communication device for data transmissions therethrough;

a common communication line connecting the vehicle-mounted computers to each other via respective ones of the communication devices;

each of the vehicle-mounted computers assigning identification data to computation data to indicate an order of priority of the computation data so that the computation data is sent from the respective ones of the communication devices to the common communication line; and each of the vehicle-mounted computers placing the computation data in groups, each of the groups corresponding to a processing cycle and sending each of the groups to the common communication devices starting in an order of one of the groups having a shortest processing cycle and in an order of one of the computation data in the one of the groups having a highest priority as indicated by the identification data.

6. A method of transmitting data in a vehicle communication system including a plurality of multiple vehicle-mounted computers, comprising:

assigning an identification data indicating a respective priority to each one of a plurality of computation data items computed by each of the vehicle-mounted computers;

storing the each one of the computation data items in a memory of one of the vehicle-mounted computers; and reordering the computation data items stored in said memory in an order of priority based on the identification data of the each one of the computation data items; and transmitting the reordered computation data items to a communications line in the order of priority.

7. The method of transmitting data in a vehicle communication system according to claim 6, further comprising:

stopping the transmitting step when another one of the vehicle-mounted computers having one of the computation data items including the identification data indicating a higher priority is to be transmitted through the communication line connecting the plurality of multiple vehicle-mounted computers; and resuming the transmitting step after the other one of the vehicle-mounted computers completes a transmission of the one of the computation data items including the identification data indicating the higher priority.

8. A method of transmitting data in a vehicle communication system including a plurality of multiple vehicle-mounted computers, comprising:

assigning an identification data indicating a respective priority to each one of a plurality of computation data items computed by each of the vehicle-mounted computers;

grouping, for each one of a plurality of processing cycles of one of the vehicle-mounted computers, a plurality of computation data items;

transmitting to a communication line, for each grouping of the computation data items, starting in an order of one of the computation data items calculated according to a shortest one of the processing cycles and in an order of highest priority as indicated by the respective identification data.

9. The method of transmitting data in a vehicle communication system according to claim 8, further comprising:

stopping the transmitting step when another one of the plurality of multiple vehicle-mounted computers having one of the computation data items including the identification data indicating a higher priority is to be transmitted through the communication line connecting the vehicle-mounted computers; and resuming the transmitting step after the other one of the vehicle-mounted computers completes a transmission of the one of the computation data items.

* * * * *